(12) United States Patent
Bruggemann et al.

(10) Patent No.: US 7,386,938 B2
(45) Date of Patent: Jun. 17, 2008

(54) METHOD OF JOINING HYDROFORMED TUBULAR MEMBERS

(75) Inventors: Charles J. Bruggemann, Rochester Hills, MI (US); Joseph M. Lendway, IV, Dryden, MI (US); Chi-Mou Ni, Washington, MI (US)

(73) Assignee: General Motors Corporation, Detroit, MI (US)

( * ) Notice: Subject to any disclaimer, the term of this patent is extended or adjusted under 35 U.S.C. 154(b) by 112 days.

(21) Appl. No.: 10/795,615

(22) Filed: Mar. 8, 2004

(65) Prior Publication Data

US 2005/0196228 A1  Sep. 8, 2005

(51) Int. Cl.
*B21D 53/88* (2006.01)
*B23P 17/00* (2006.01)
*B25G 3/36* (2006.01)

(52) U.S. Cl. .................. 29/897.2; 29/421.1; 29/525.14; 72/54; 403/230; 403/393

(58) Field of Classification Search .................. 29/897, 29/897.2, 421.1, 525.14; 72/54, 56, 58, 60, 72/61; 403/231, 230, 263, 393; 228/173.1
See application file for complete search history.

(56) References Cited

U.S. PATENT DOCUMENTS

| | | | |
|---|---|---|---|
| 2,992,479 A | 7/1961 | Musser et al. | |
| 3,579,805 A | 5/1971 | Kast | |
| 5,170,557 A | 12/1992 | Rigsby | |
| 5,333,775 A | 8/1994 | Bruggemann et al. | |
| 5,720,092 A | 2/1998 | Ni et al. | |
| 5,865,362 A * | 2/1999 | Behrmann et al. | 228/114.5 |
| 6,183,013 B1 | 2/2001 | Mackenzie et al. | |
| 6,282,790 B1 * | 9/2001 | Jaekel et al. | 29/897.2 |
| 6,293,618 B1 * | 9/2001 | Sukegawa et al. | 296/209 |
| 6,361,244 B1 | 3/2002 | Ni et al. | 403/393 |
| 6,474,534 B2 | 11/2002 | Gabbianelli et al. | |
| 6,484,384 B1 | 11/2002 | Gibson et al. | |
| 6,487,886 B2 * | 12/2002 | Ueno et al. | 72/57 |
| 6,532,639 B2 * | 3/2003 | Ni et al. | 29/421.1 |
| 6,609,301 B1 | 8/2003 | Morris et al. | |
| 6,654,995 B1 | 12/2003 | Wang et al. | |
| 6,701,598 B2 | 3/2004 | Chen et al. | |
| 6,739,166 B1 | 5/2004 | Shah | |
| 2001/0000119 A1 * | 4/2001 | Jaekel et al. | 296/29 |
| 2003/0204944 A1 | 11/2003 | Norek | |

* cited by examiner

Primary Examiner—Jermie Cozart (57) ABSTRACT

A hydroformed dovetail joint and method of joining tubular members includes a first hydroformed tubular member having a depression therein and a second hydroformed tubular member having an end. The end of the second hydroformed tubular member is disposed over the depression of the first hydroformed tubular member to join the first hydroformed tubular member and the second hydroformed tubular member together to form a dovetail joint between the first hydroformed tubular member and the second hydroformed tubular member.

12 Claims, 8 Drawing Sheets

METHOD OF JOINING HYDROFORMED TUBULAR MEMBERS

TECHNICAL FIELD

The present invention relates generally to forming a shaped tubular member and, more particularly, to a hydroformed dovetail joint and method of joining tubular members of hydroformed metal tubing for assembling automotive structures.

BACKGROUND OF THE INVENTION

Figures 1, 1A:
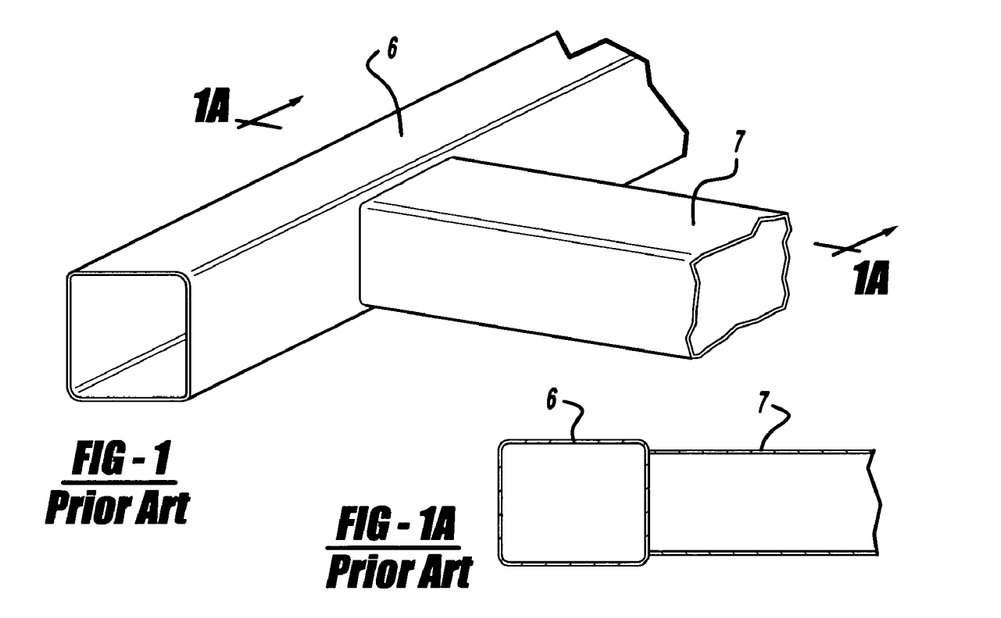
FIG. 1 is a perspective view of a prior art straight cut butt joint for tubular members.
FIG. 1A is a sectional view taken along line 1A-1A of FIG. 1.
Figures 2, 2A:
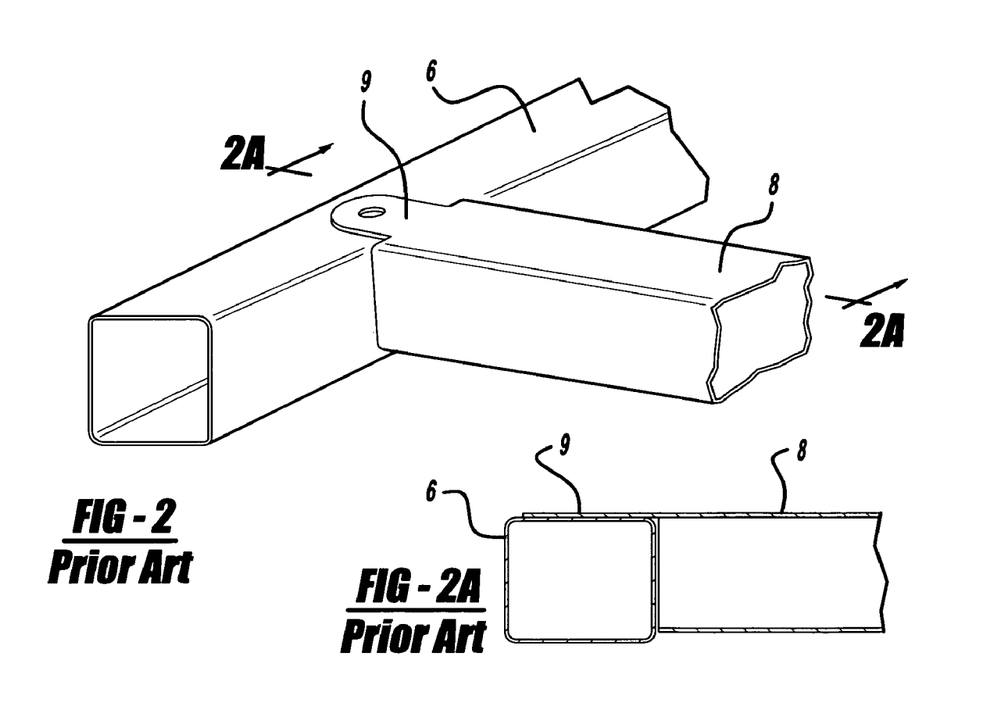
FIG. 2 is a perspective view of a prior art shirt tail joint for tubular members.
FIG. 2A is a sectional view taken along line 2A-2A of FIG. 1.

It is known to hydroform tubular components. Hydroformed tubular components are becoming increasingly popular in automotive body structural applications. During vehicle body manufacturing, many of the hydroformed tubular components are joined to one another. One method for joining the hydroformed tubular components is to make a straight cut butt joint as illustrated in FIGS. 1 and 1A. In this joint, hydroformed tubular members 6 and 7 have straight cut ends and one end of the tubular member 7 is butted against the side of the other tubular member 6 and welded together. Another method for joining the hydroformed tubular components is to make a shirt tail joint as illustrated in FIGS. 2 and 2A. In this joint, hydroformed tubular members 6 and 8 have straight cut ends and the tubular member 8 has a flange 9 overlapping the tubular member 6 when one end of the tubular member 8 is butted against the side of the other tubular member 6 and welded together. However, these joints require costly precision end cut processing due to joint dimensional variation and positional variation.

As a result, it is desirable to provide a new method of joining tubular members together to form a joint therebetween. It is also desirable to provide a method of joining tubular members together without costly precision end cut processing. It is further desirable to provide a joint for joining tubular members together that accommodates joint dimensional variation and positional variation. Therefore, there is a need in the art to provide a new joint and method of joining tubular members together that meets these desires.

SUMMARY OF THE INVENTION

It is, therefore, one object of the present invention to provide a new method of joining tubular members together to form a joint therebetween.

It is another object of the present invention to provide a new joint for joining tubular members together.

To achieve the foregoing objects, the present invention is a hydroformed dovetail joint including a first hydroformed tubular member having a depression therein and a second hydroformed tubular member having an end. The end of the second hydroformed tubular member is disposed over the depression of the first hydroformed tubular member to join the first hydroformed tubular member and the second hydroformed tubular member together to form a dovetail joint between the first hydroformed tubular member and the second hydroformed tubular member.

Also, the present invention is a method of joining tubular members together. The method includes the steps of hydroforming a first tubular member having a depression therein and hydroforming a second tubular member having an end. The method also includes the steps of positioning the end of the second tubular member over the depression of the first tubular member and joining the first tubular member and the second tubular member together to form a dovetail joint between the first tubular member and second tubular member.

One advantage of the present invention is that a dovetail joint is provided for joining hydroformed tubular members together. Another advantage of the present invention is that a method of joining tubular members together is provided to form a hydroformed dovetail joint therebetween. Yet another advantage of the present invention is that a dovetail joint between hydroformed tubular members may be welded along interface edges without precision end cutting of the attaching hydroformed component to assemble hydroframe structures for vehicles. Still another advantage of the present invention is that the joint and method eliminates costly end cuts and provides non-critical weld positioning, allowing easier and faster assembly of hydroformed tubular members. A further advantage of the present invention is that the joint and method provides joint interfaces that are flare-bevel interfaces, which are desired. Yet a further advantage of the present invention is that the joint and method allows no single thickness edge along weld lines, thereby reducing the potential for burn-through during welding. Still a further advantage of the present invention is that the joint and method provides joints that can be positioned within a larger positional tolerance because no gaps are created in the interfaces. Another advantage of the present invention is that the joint and method provides a net positioning condition through contact between formed contours and coordinated holes in the mating parts. Yet another advantage of the present invention is that the joint and method provides netting features created in the forming die, and consequently are well coordinated with other features on the parts, yielding very low dimensional variation. Still another advantage of the present invention is that the joint and method avoids the cost of producing three stage trim cuts or laser cuts in the attaching part.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 3:
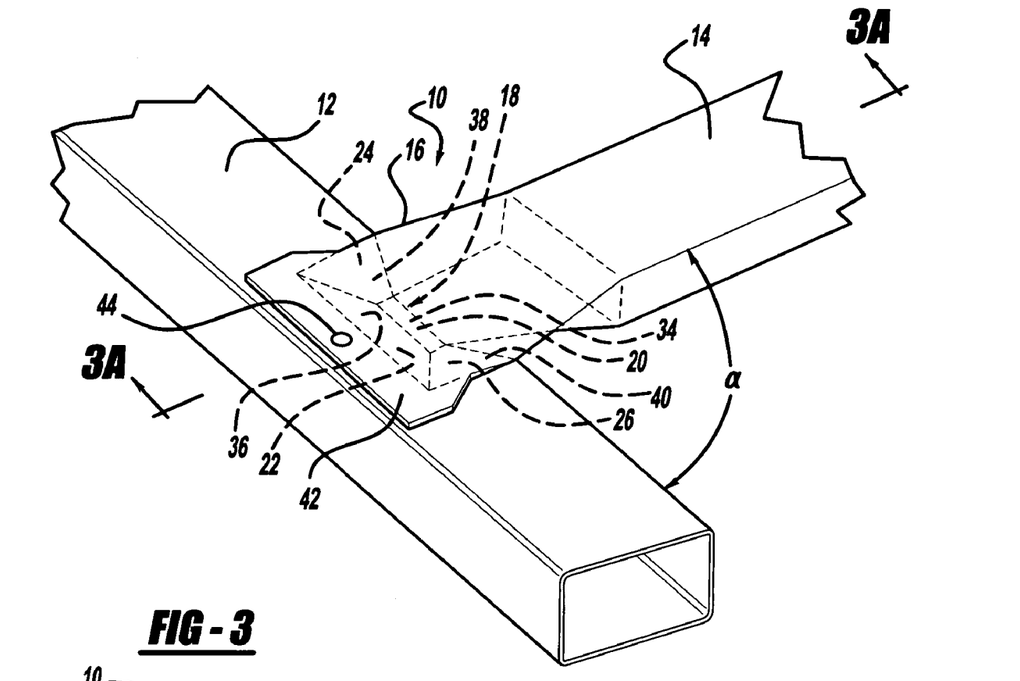
FIG. 3 is a perspective view of a hydroformed dovetail joint, according to the present invention, for joining tubular members.
Figure 3A:
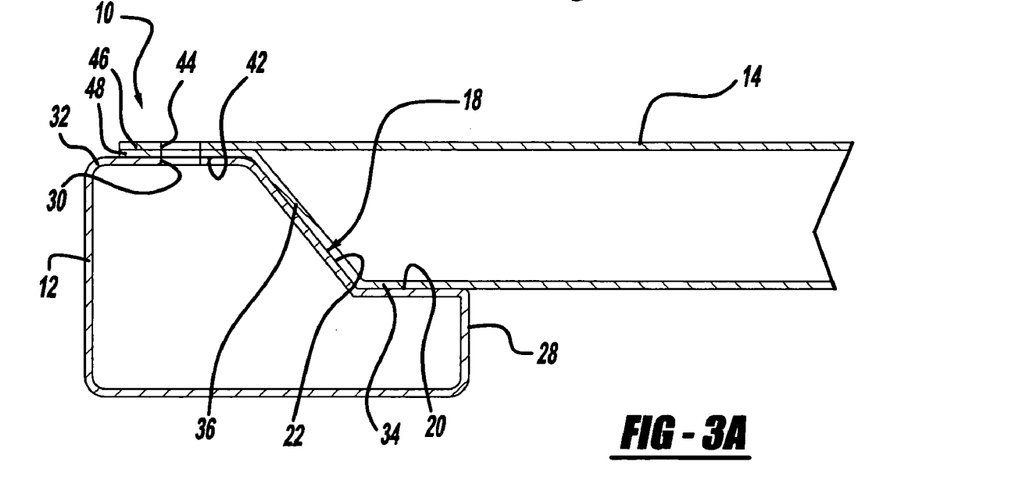
FIG. 3A is a sectional view taken along line 3A-3A of FIG. 3.

Referring to the drawings and in particular FIGS. 3 and 3A, one embodiment of a hydroformed dovetail joint 10, according to the present invention, for tubular members 12 and 14 is shown for use in carrying out a method, according to the present invention, of joining the tubular members 12 and 14 with the hydroformed dovetail joint 10 therebetween for assembly in automotive structures (not shown). The method includes the step of providing a first tubular member 12 and a second tubular member 14. The first and second tubular members 12 and 14 are made of a metal material. In one embodiment, the first tubular member 12 has a generally rectangular cross-sectional shape and extends axially and the second tubular member 14 has a generally rectangular cross-sectional shape and extends axially. The second tubular member 14 has an end 16 extending axially which is joined to a side of the first tubular member 12 to overlap a portion of the first tubular member 12 when the first and second tubular members 12 and 14 are joined by the method, according to the present invention. In the embodiment illustrated, the second tubular member 14 is orientated generally perpendicular to the first tubular member 12 at an angle alpha (α) of ninety degrees (90°). It should be appreciated that the joint 10 is an overlapping or dovetail joint.

The method also includes the step of forming a depression, generally indicated at 18, in a surface of the first tubular member 12. The depression 18 has a plurality of planar first, second, third, and fourth surfaces 20,22,24,26. The first surface 20 is a generally horizontal surface and the second surface 22 is a generally inclined surface extending upwardly at an angle from an end of the first surface 20. The third surface 24 is a generally inclined surface extending upwardly at an angle from one side of the first surface 20 and the fourth surface 26 is a generally inclined surface extending upwardly at an angle from the other side of the first surface 20. The first tubular member 12 also includes a compensating surface 28, which preserves a nominal cross sectional perimeter of the tubular member 12. The compensating surface 28 is a generally planar surface that extends downwardly generally perpendicular to the first surface 20 of the depression 18. The first tubular member 12 may include an aperture 30 extending through a top wall 32 thereof. It should be appreciated that the first tubular member 12 is a monolithic structure being integral, unitary, and one-piece. It should also be appreciated that the first tubular member 12 is hydroformed to form the depression 18 in a manner to be described.

The method includes the step of forming the end 16 of the second tubular member 14 with a nominal shape which transitions to a cross-section that corresponds to an outline of the depression 18 of the first tubular member 12. The end 16 has a plurality of planar first, second, third, and fourth surfaces 34,36,38,40. The first surface 34 is a generally horizontal surface and the second surface 36 is a generally inclined surface extending upwardly at an angle from an end of the first surface 34. The third surface 38 is a generally inclined surface extending upwardly at an angle from one side of the first surface 34 and the fourth surface 40 is a generally inclined surface extending upwardly at an angle from the other side of the first surface 34. The first surface 34 of the second tubular member 14 corresponds to a width of the first surface 20 of the first tubular member 12 and the second surface 36 of the second tubular member 14 tapers in depth in coordination with the second surface 22 of the first tubular member 12. The third surface 38 and fourth surface 40 of the second tubular member 14 correspond to the third surface 24 and fourth surface 26 of the first tubular member 12. The end 16 also has a planar fifth surface 42, which is a generally horizontal surface extending axially from an upper end of the second surface 36. The second tubular member 14 may include an aperture 44 extending through a top wall 46 and bottom wall 48 of the end 16. Preferably, the aperture 44 of the second tubular member 14 is aligned with the aperture 30 of the first tubular member 12. It should be appreciated that the second tubular member 14 is a monolithic structure being integral, unitary, and one-piece. It should also be appreciated that the first surface 34 is a drag section. It should further be appreciated that the second tubular member 14 is hydroformed to form the end 16 in a manner to be described.

The method includes the step of positioning the end 16 of the second tubular member 14 in the depression 18 of the first tubular member 12 and forming an overlap region or the dovetail joint 10. In one embodiment, the method includes the step of joining the first tubular member 12 and the second tubular member 14 together. Preferably, the joining is provided by welding along an interface between the first tubular member 12 and the second tubular member 14. The welding occurs at a top surface of the top wall 32 of the first tubular member 12 and along the first, third, and fourth surfaces 34, 38, and 40 of the second tubular member 14 at a side surface of the first tubular member 12. It should be appreciated that the first surface 20 of the first tubular member 12 is of a width of the first surface 34 of the second tubular member 14 and allows the second tubular member 14 the flexibility of being shifted by up to a distance of the first surface 34 of the second tubular member 14 while still maintaining the possibility of all-around welding. It should also be appreciated that the close correspondence of the depression 18 in the first tubular member 12 and transition shapes in the end 16 of the second tubular member 14 provide four-way net positioning of the first and second tubular members 12 and 14. It should further be appreciated that the apertures 30 and 44 in the first and second tubular members 12 and 14, respectively, provides a complete three dimensional geometrical relationship imposed on the first and second tubular members 12 and 14 without supplementary part gaging.

The method further includes the step of hydroforming the first tubular member 12 and the second tubular member 14 prior to positioning the first tubular member 12 and second tubular member 14 together. Each of the first tubular member 12 and second tubular member 14 is placed in a die set (not shown) comprised of an upper die half (not shown) and a lower die half (not shown). The upper die half includes a tubular forming cavity portion for either the first tubular member 12 or the second tubular member 14. Likewise, the lower die half includes a tubular forming cavity portion for either the first tubular member 12 or the second tubular member 14.

The ends of each of the first tubular member 12 and second tubular member 14 are sealed and hydraulic fluid is pumped into each of the first tubular member 12 and second tubular member 14 under pressure. The upper die half and lower die half are progressively closed so that each of the first tubular member 12 and second tubular member 14 is progressively deformed and the pressurized fluid captured therein expands the walls of each of the first tubular member 12 and second tubular member 14 into the cavity portions of the die.

The die halves are fully closed upon one another with either the first tubular member 12 or second tubular member 14 being tightly clamped between the die halves. During this closing of the die halves, a relatively constant hydraulic pressure may be maintained within the respective first tubular member 12 or second tubular member 14 by incorporating a pressure relief valve (not shown) into the seal enclosing the ends thereof so that hydraulic fluid may be forced from the tubular member as it collapses.

Once the die is closed, the first tubular member 12 or second tubular member 14 is then expanded to a final cross-sectional profile by increasing the hydraulic pressure sufficient to exceed the yield limit of the first tubular member 12 or second tubular member 14 so that the respective tubular member is forced into conformity with the tubular forming cavity portions of the die halves. The die halves are then opened to permit removal of the finished first tubular member 12 or second tubular member 14 from the die halves. It should be appreciated that the die halves are designed to provide the desired cross-sectional tubular shape and to form either the depression 18 in the first tubular member 12 or the end 16 in the second tubular member 14.

Figure 4:
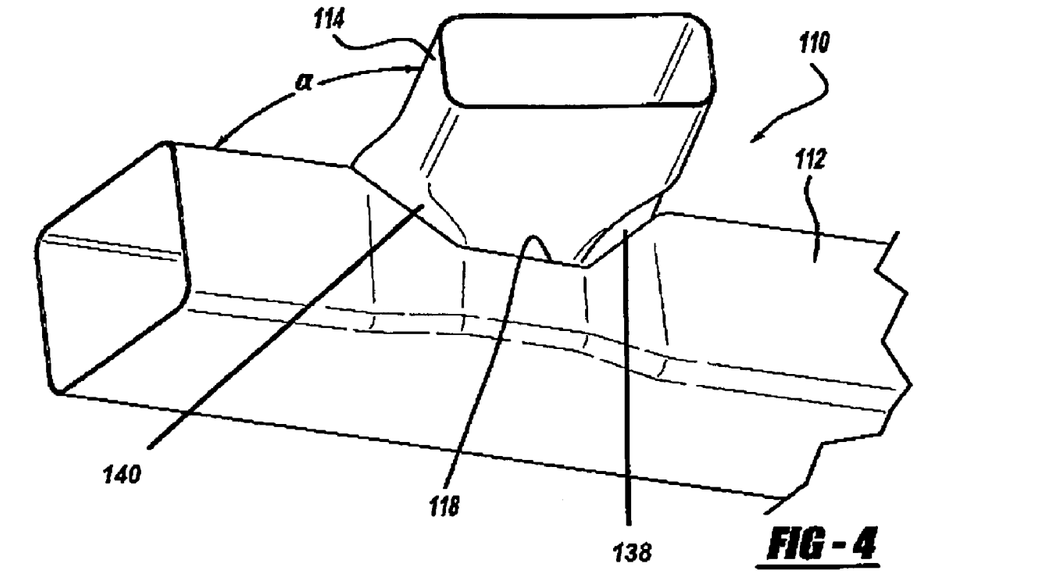
FIG. 4 is a perspective view of another embodiment, according to the present invention, of a hydroformed dovetail joint for joining tubular members.
Figure 4A:
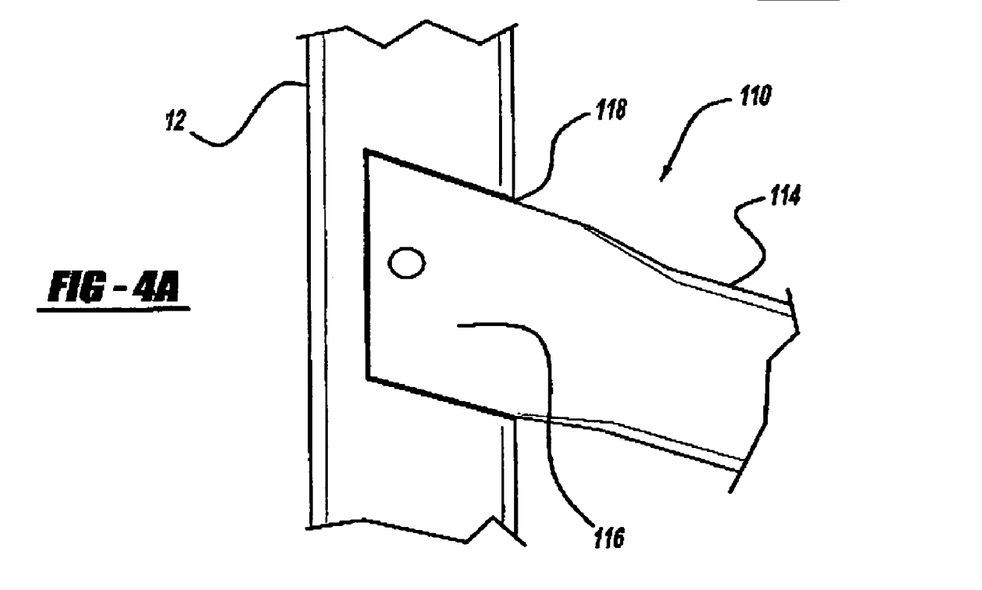
FIG. 4A is a plan view of the hydroformed dovetail joint of FIG. 4.
Figure 4B:
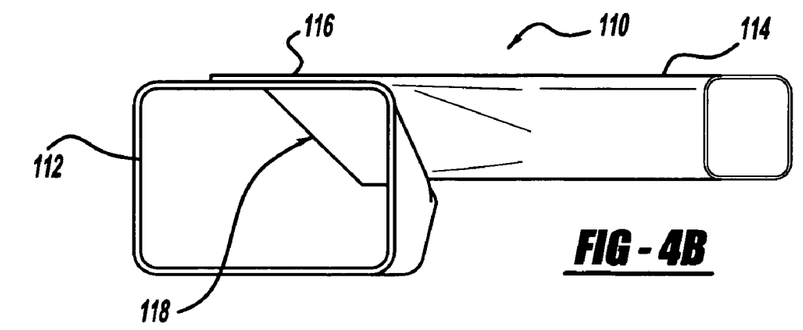
FIG. 4B is an elevational view of the hydroformed dovetail joint of FIG. 4.
Figure 4C:
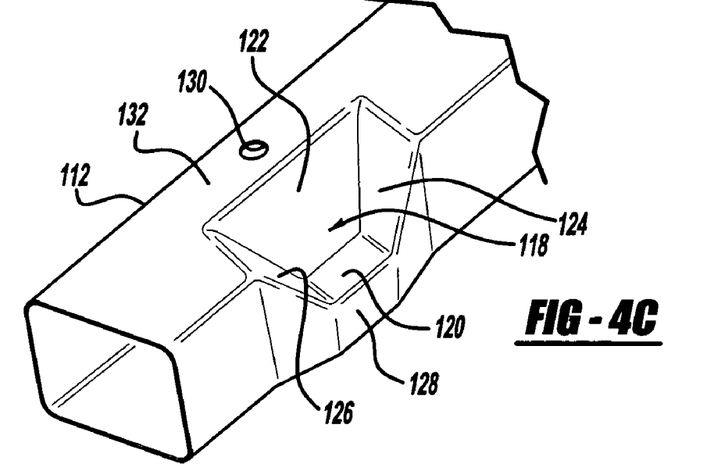
FIG. 4C is a perspective view of a portion of the hydroformed dovetail joint of FIG. 4.
Figure 4D:
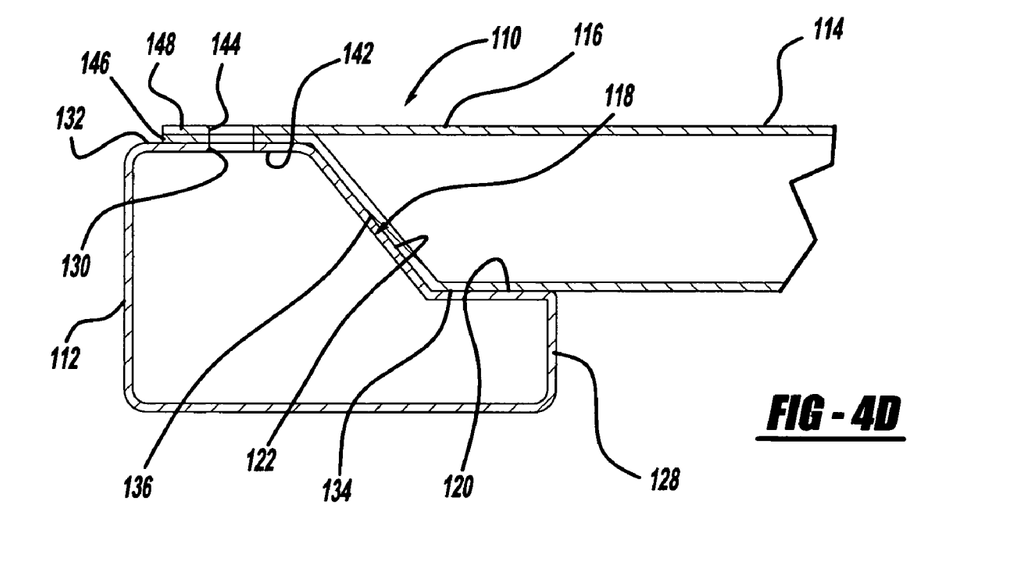
FIG. 4D is a sectional view of the hydroformed dovetail joint of FIG. 4.

Referring to FIGS. 4 through 4D, another embodiment, according to the present invention, of the joint 10 is shown. Like parts of the joint 10 have like reference numerals increased by one hundred (100). In this embodiment, the joint 110 includes the first tubular member 112 and the second tubular member 114. The first tubular member 112 includes the depression 118 having the first, second, third, and fourth surfaces 120,122,124,126. The first tubular member 112 also includes the compensating surface 128 and the aperture 130 extending through the top wall 132 thereof.

The second tubular member 114 includes the end 116 having the first, second, third, and fourth surfaces 134,136, 138,140. The end 116. also has the fifth surface 142 and may include the aperture 144 extending through the top wall 146 and bottom wall 148 of the end 116.

In the embodiment illustrated in FIGS. 4 through 4D, the first tubular member 112 and the second tubular member 114 are not perpendicular to each other, but are orientated at an angle alpha (α) less than ninety degrees (90°). The first tubular member 112 has the depression 118 orientated along the axis of the second tubular member 114 so that motion of the second tubular member 114 of up to a distance of the first surface 134 is possible while maintaining contact between the first tubular member 112 and the second tubular member 114 to enable all-around welding. It should also be appreciated that the joint 110 may be welded as previously described.

Figure 5:
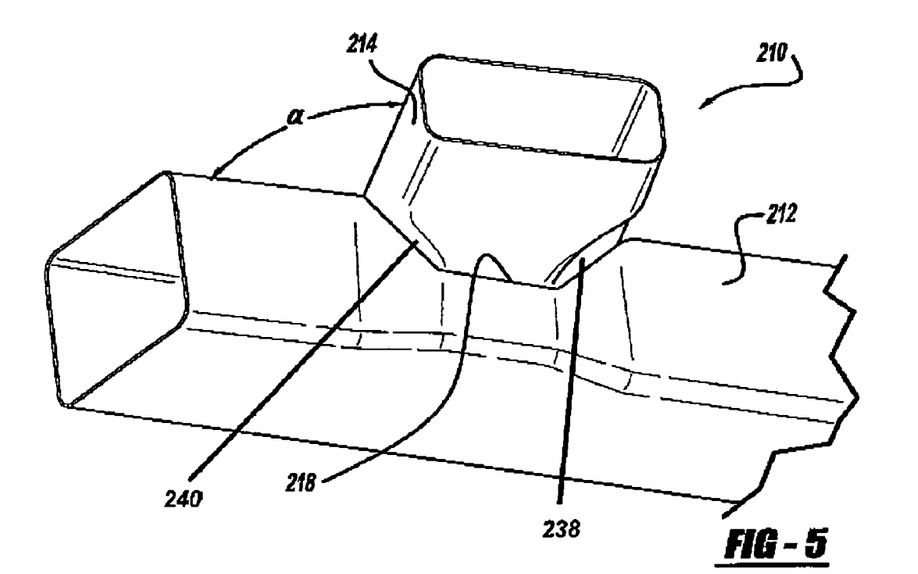
FIG. 5 is a perspective view of yet another embodiment, according to the present invention, of a hydroformed dovetail joint for joining tubular members.
Figure 5A:
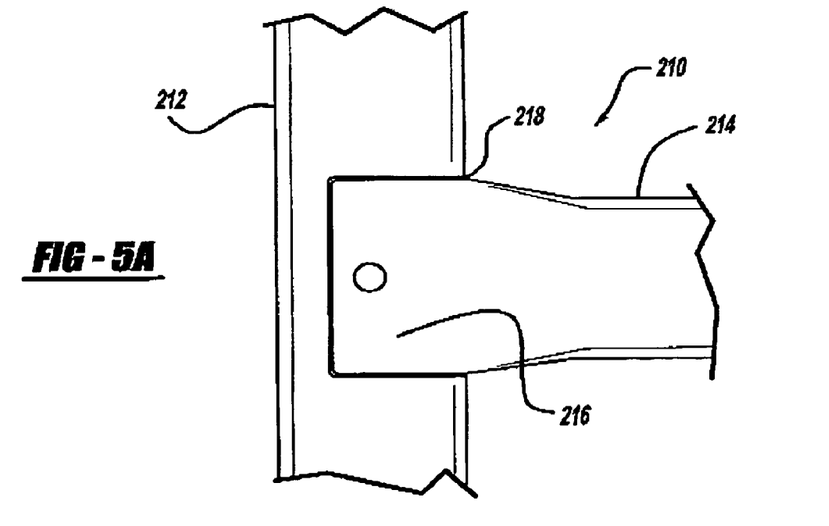
FIG. 5A is a plan view of the hydroformed dovetail joint of FIG. 5.
Figure 5B:
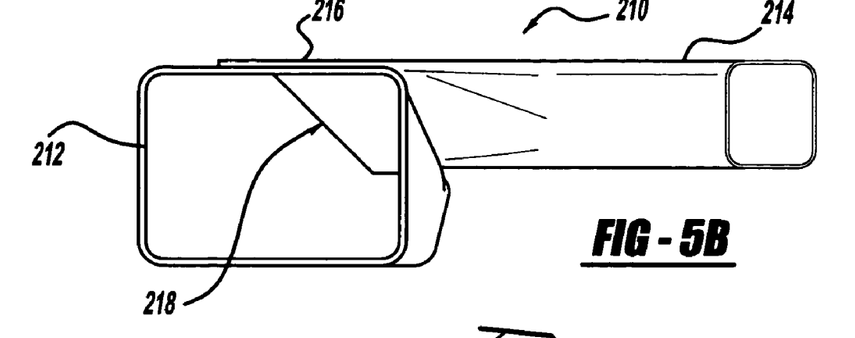
FIG. 5B is an elevational view of the hydroformed dovetail joint of FIG. 5.
Figure 5C:
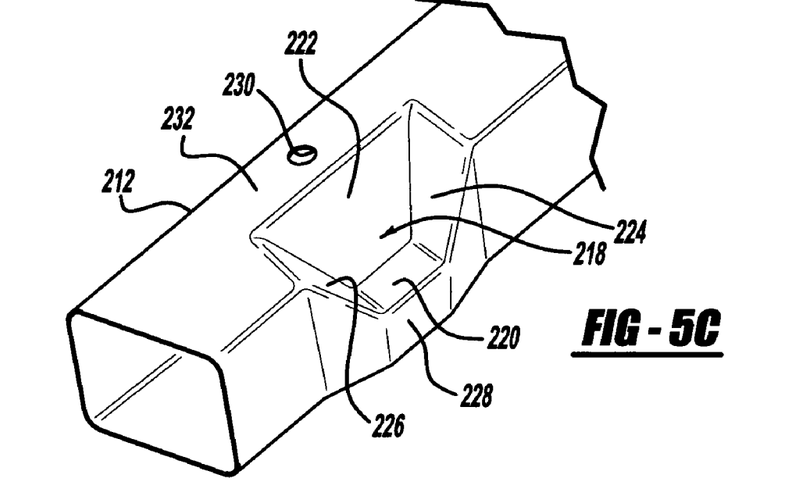
FIG. 5C is a perspective view of a portion of the hydroformed dovetail joint of FIG. 5.
Figure 5D:
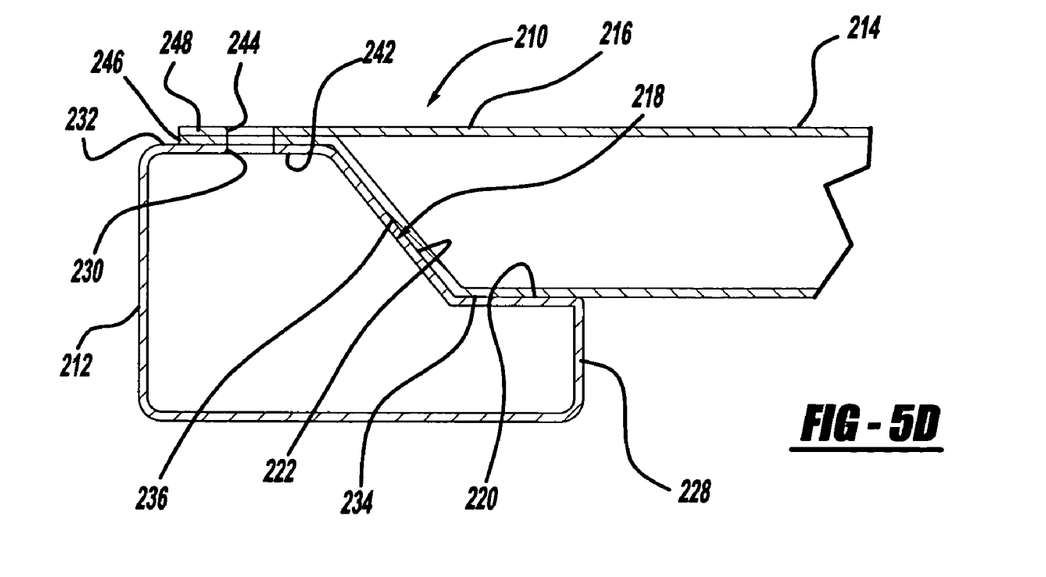
FIG. 5D is a sectional view of the hydroformed dovetail joint of FIG. 5.

Referring to FIGS. 5 through 5D, yet another embodiment, according to the present invention, of the joint 10 is shown. Like parts of the joint 10 have like reference numerals increased by two hundred (200). In this embodiment, the joint 210 includes the first tubular member 212 and the second tubular member 214. The first tubular member 212 includes the depression 218 having the first, second, third, and fourth surfaces 220,222,224,226. The first tubular member 212 also includes the compensating surface 228 and the aperture 230 extending through the top wall 232 thereof.

The second tubular member 214 includes the end 216 having the first, second, third, and fourth surfaces 234,236, 238,240. The end 216 also has the fifth surface 242 and may include the aperture 244 extending through the top wall 246 and bottom wall 248 of the end 216.

In the embodiment illustrated in FIGS. 5 through 5D, the third surface 224 of the first tubular member 212 is produced in the same alignment as the first tubular member 12 of FIG. 3. In this embodiment, the first surface 220 of the first tubular member 212 is no longer a rectangle, however, the first surface 234 and the fourth surface 240 of the second tubular member 214 and the fourth surface 226 of the first tubular member 212 are similar to that of FIG. 4. The second surface 222 of the first tubular member 212 retains the same slope to the top of the first tubular member 212, but does not have the same shape. It should also be appreciated that the joint 210 may be welded as previously described.

Figure 6A:
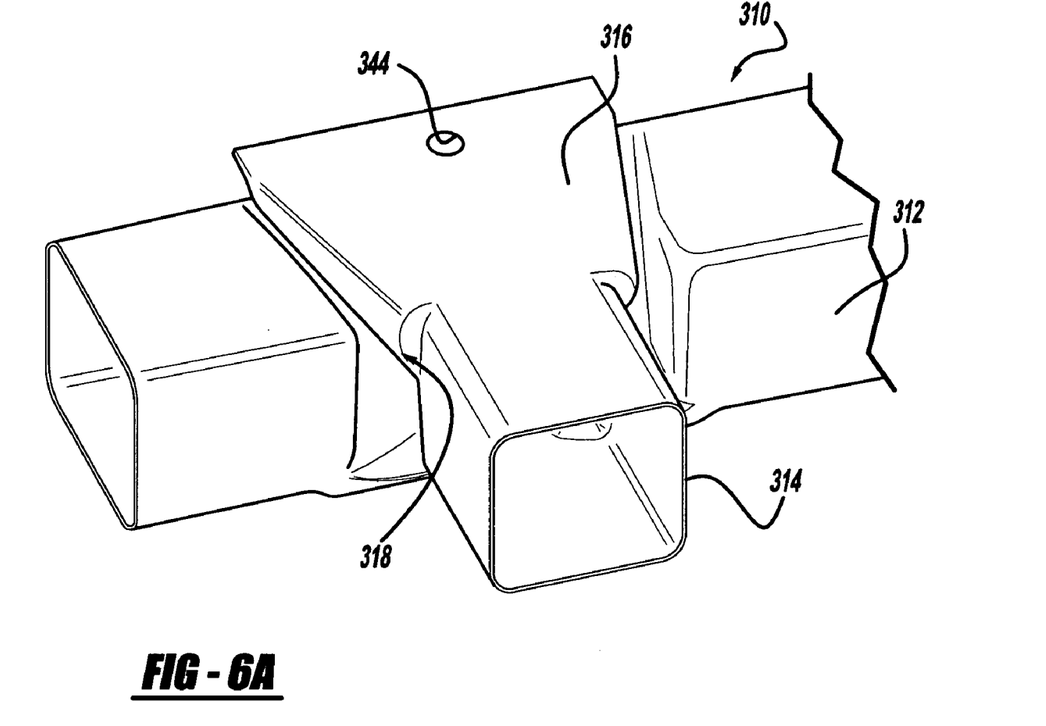
FIG. 6A is a perspective view of still another embodiment, according to the present invention, of a hydroformed dovetail joint for joining tubular members.
Figure 6B:
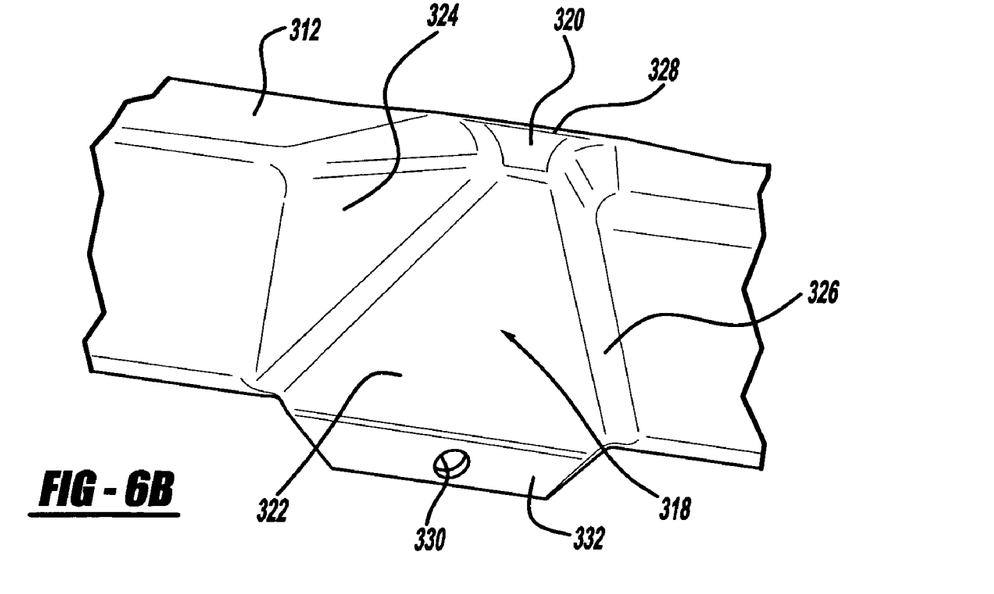
FIG. 6B is a perspective view of a portion of the hydroformed dovetail joint of FIG. 6A.
Figure 6C:
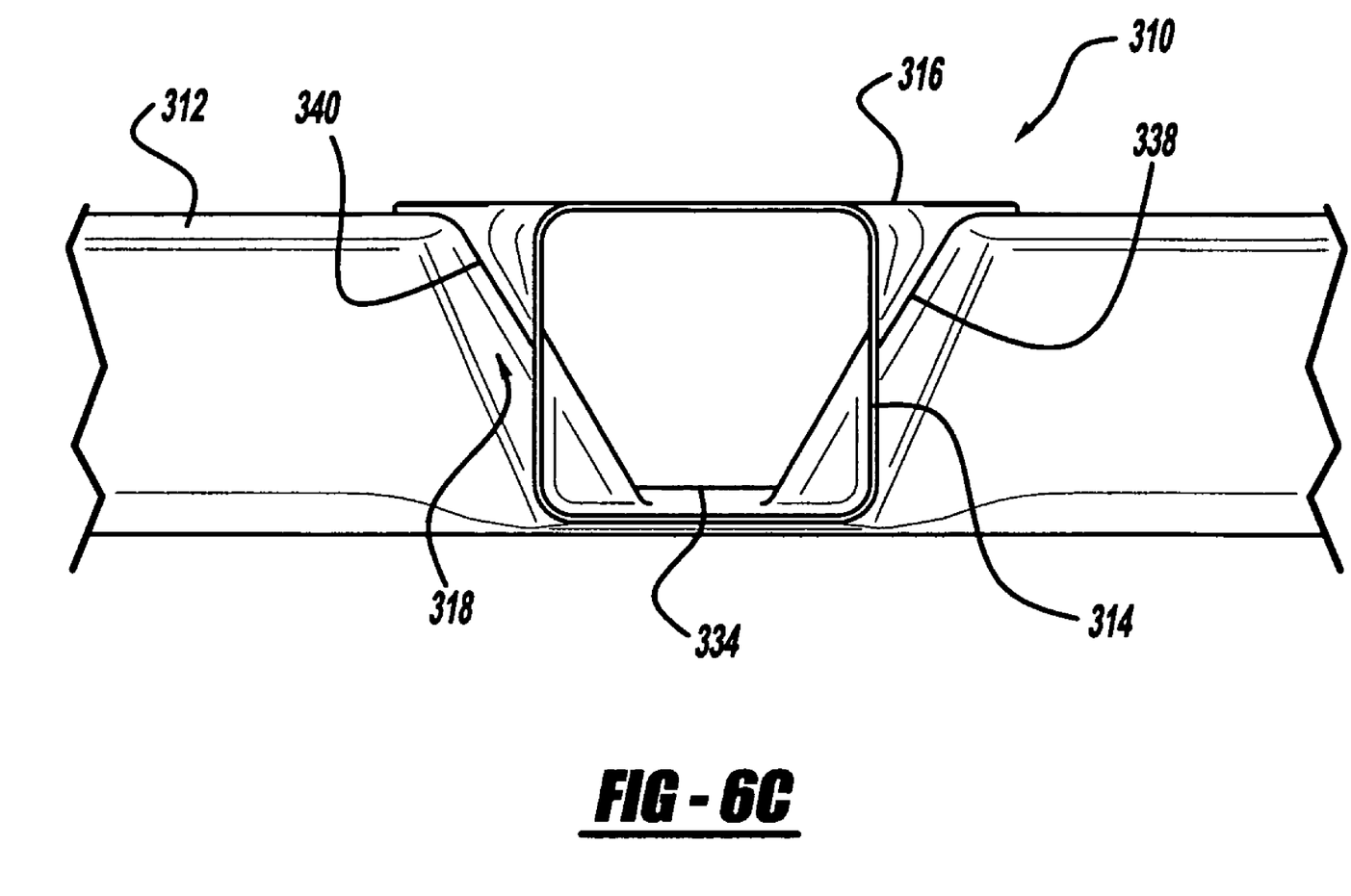
FIG. 6C is an elevational view of the hydroformed dovetail joint of FIG. 6A.

Referring to FIGS. 6A through 6C, still another embodiment, according to the present invention, of the joint 10 is shown. Like parts of the joint 10 have like reference numerals increased by three hundred (300). In this embodiment, the joint 310 includes the first tubular member 312 and the second tubular member 314. The first tubular member 312 includes the depression 318 having the first, second, third, and fourth surfaces 320,322,324,326. The first tubular member 312 also includes the compensating surface 328 and the aperture 330 extending through the top wall 332 thereof.

The second tubular member 314 includes the end 316 having the first, second, third, and fourth surfaces 334, (not shown), 338,340. The end 316 may include the aperture 344 extending therethrough. In the embodiment illustrated, the joint 310 may have a single or double pinch weld flange for conventional spotwelding. It should also be appreciated that the joint 310 may be welded as previously described.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. A method of joining tubular members together, said method comprising the steps of:

hydroforming a first tubular member having a depression therein with a plurality of planar surfaces, wherein the planar surfaces comprise a first surface extending generally horizontally, a second surface extending upwardly at an angle from an end of said first surface, a third surface extending upwardly at an angle from one side of said first surface, and a fourth surface extending upwardly at an angle from another side of said first surface;

hydroforming a second tubular member having an end, said end having a plurality of planar surfaces including at least a generally horizontal first surface and a second surface extending at an inclined angle from an end of said first surface, said end also comprising a generally horizontal planar fifth surface extending from an upper end of said second surface;

positioning the end of the second tubular member over the depression of the first tubular member, wherein said fifth surface overlaps a top surface of said first hydroformed tubular member; and joining the first tubular member and the second tubular member together to form a dovetail joint between the first tubular member and second tubular member.

2. A method as set forth in claim 1 wherein said step of hydroforming the first tubular member comprises hydroforming a compensating surface extending downwardly generally perpendicular to the first surface of the depression.

3. A method as set forth in claim 1 wherein said step of hydroforming the first tubular member comprises hydroforming an aperture extending through a top wall of the first tubular member.

4. A method as set forth in claim 1 wherein said step of hydroforming the second tubular member comprises hydroforming an aperture extending through the fifth surface of the second hydroformed tubular member.

5. A method as set forth in claim 1 including the step of orientating the second hydroformed tubular member at an angle of approximately ninety degrees relative to a longitudinal axis of the first hydroformed tubular member.

6. A method as set forth in claim 1 including the step of orientating the second hydroformed tubular member at an angle less than ninety degrees relative to a longitudinal axis of the first hydroformed tubular member.

7. A method as set forth in claim 1 wherein said step of joining comprises welding an interface between the first hydroformed tubular member and the second hydroformed tubular member.

8. A method as set forth in claim 1 wherein said step of hydroforming said second tubular member includes hydroforming said first surface of said second tubular member as a drag section allowing said second tubular member to be shifted relative to said first tubular member while maintaining possibility of joining said first tubular member and said second tubular member.

9. A method of joining tubular members together, said method comprising the steps of:

hydroforming a first tubular member having a depression therein;

hydroforming a second tubular member having an end with a plurality of planar surfaces;

positioning the end of the second tubular member over the depression of the first tubular member;

joining the first tubular member and the second tubular member together to form a dovetail joint between the first tubular member and second tubular member; and wherein the planar surfaces comprise a first surface extending generally horizontally, a second surface extending upwardly at an angle from an end of the first surface, a third surface extending upwardly at an angle from one side of the first surface, and a fourth surface extending upwardly at an angle from another side of the first surface;

wherein said step of hydroforming the second tubular member comprises hydroforming the end with a planar fifth surface that is a generally horizontal surface extending axially from the second surface and overlapping a top surface of the first hydroformed tubular member.

10. A method as set forth in claim 9 wherein said step of hydroforming the first tubular member comprises hydroforming the depression in the first tubular member with a second plurality of planar surfaces.

11. A method as set forth in claim 9 wherein said step of hydroforming the second tubular member comprises hydroforming the end with an aperture extending through a top wall and bottom wall of the second tubular member.

12. A method as set forth in claim 9 wherein said step of hydroforming said second tubular member includes hydroforming said first surface as a drag section allowing said second tubular member to be shifted relative to said first tubular member while maintaining possibility of joining said first tubular member and said second tubular member.

* * * * *